United States Patent
White et al.

(10) Patent No.: US 7,055,834 B1
(45) Date of Patent: Jun. 6, 2006

(54) KNOCK-DOWN ICE CHEST STAND/CART

(76) Inventors: Richar W. White, White's Marina 846 No. Dixie Hwy., Lake Worth, FL (US) 33462; Robert J. White, White's Marina 846 No. Dixie Hwy., Lake Worth, FL (US) 33462

( * ) Notice: Subject to any disclaimer, the term of this patent is extended or adjusted under 35 U.S.C. 154(b) by 204 days.

(21) Appl. No.: 10/829,628

(22) Filed: Apr. 22, 2004

(51) Int. Cl.
*B62B 3/02* (2006.01)
(52) U.S. Cl. ............... 280/47.35; 280/638; 280/35; 280/651
(58) Field of Classification Search ......... 280/47.34–5, 280/47.11, 79.2–79.3, 79.11, 30, 32.6, 35, 280/651, 638, 639; 108/157.13, 155, 159, 108/157.18, 158.11, 158.13; 224/409, 411, 224/482
See application file for complete search history.

(56) References Cited

U.S. PATENT DOCUMENTS

| | | | | |
|---|---|---|---|---|
| 1,912,847 A | * | 6/1933 | Klepel ..................... 206/503 |
| 2,695,712 A | * | 11/1954 | Kolander .................. 211/74 |
| 3,121,496 A | * | 2/1964 | Brunette .................. 211/126.8 |
| 3,189,363 A | * | 6/1965 | Pierrat ..................... 280/35 |
| 3,599,580 A | * | 8/1971 | Adair et al. ............ 108/157.13 |
| 3,787,072 A | * | 1/1974 | DeBoer et al. .......... 280/79.11 |
| 3,997,139 A | * | 12/1976 | Young et al. ............... 248/165 |
| 4,099,735 A | * | 7/1978 | Becker, III ................ 280/79.3 |
| 4,630,550 A | | 12/1986 | Weitzman |
| 4,974,526 A | * | 12/1990 | Wiygul, Jr. ................ 108/159 |
| 5,370,245 A | * | 12/1994 | Tersch et al. ................ 211/74 |
| 5,437,165 A | | 8/1995 | White |
| 5,931,019 A | | 8/1999 | White |
| 6,213,333 B1 | * | 4/2001 | Icard ..................... 220/482 |
| 6,550,791 B1 | | 4/2003 | Ramsey |
| 6,651,456 B1 | | 11/2003 | White |
| 6,811,163 B1 | * | 11/2004 | Gurule et al. ............. 280/79.3 |
| 6,969,077 B1 | * | 11/2005 | Liu .......................... 280/30 |

* cited by examiner

*Primary Examiner*—Christopher P. Ellis
*Assistant Examiner*—Vaughn Coolman
(74) *Attorney, Agent, or Firm*—Alvin S. Blum

(57) ABSTRACT

A stand for coolers or insulated ice chests can be readily assembled and disassembled for transport and storage without tools. Front and rear frame members of bent tubing are joined to side members of bent tubing by threaded fasteners and wing nuts. The stand may be provided with wheels. It may be provided with a first bottle rack that is suspended from its front member. A second bottle rack may be suspended from a side frame member.

16 Claims, 4 Drawing Sheets

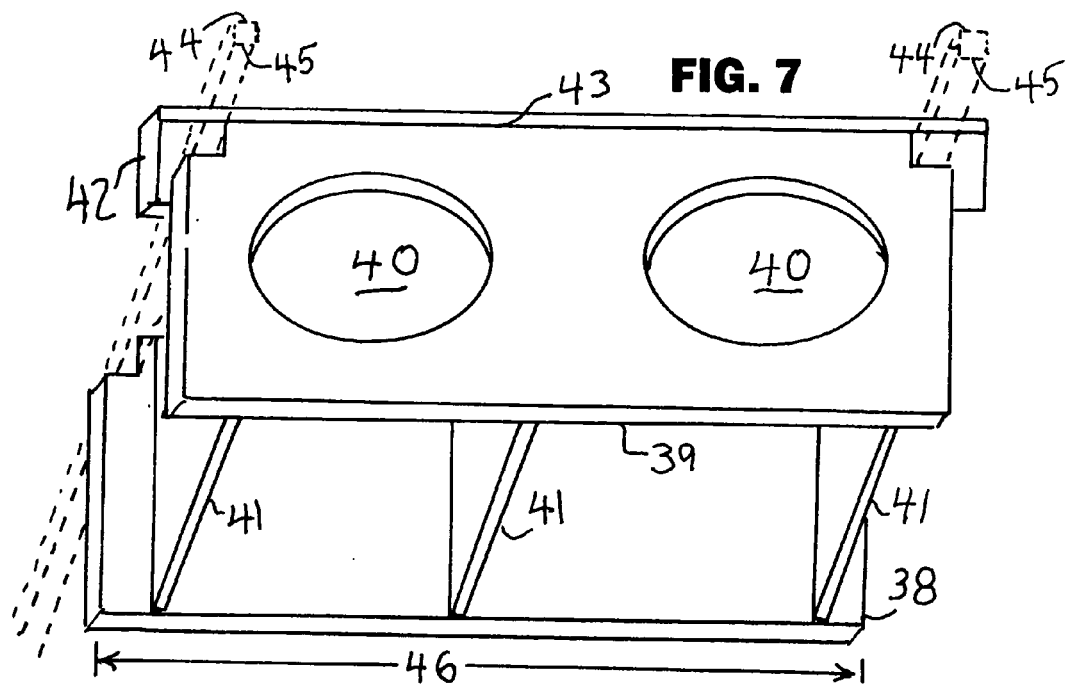
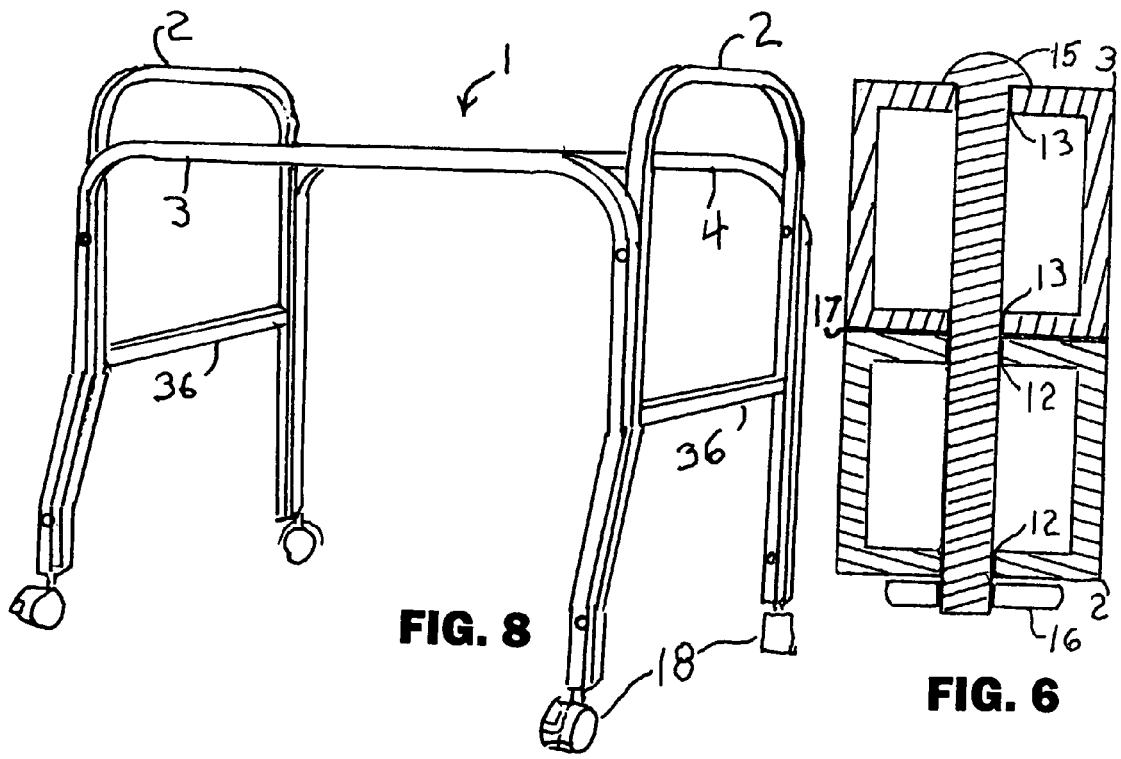

KNOCK-DOWN ICE CHEST STAND/CART

This invention relates to stands and carts that may be readily assembled for use and then readily disassembled for transport/storage, and more particularly for such devices for holding ice chests/coolers together with items for use therewith.

BACKGROUND OF THE INVENTION

Sturdy worktables with prefabricated knock down frames are disclosed by U.S. Pat. No. 4,630,550 issued Dec. 23, 1986 to Weitzman. He employs square section tubing that telescope into special square section tubing connectors to hold heavy equipment. U.S. Pat. No. 6,550,791 issued Apr. 22, 2003 to Ramsey discloses a cart for holding a cooler and fishing accessories that is not knock-down. U.S. Pat. No. 6,651,456 issued Nov. 25, 2003 to applicants discloses a rolling cart with an ice chest. Since coolers with accessories are often employed at public gathering events in diverse locales, and may not be used in between events, it would be useful to have carts and stands that will be readily disassembled and reassembled without tools for transport and storage.

SUMMARY OF THE INVENTION

It is accordingly an object of the invention to provide stationary stands, with or without wheels, especially constructed for use with coolers that can be assembled and disassembled without tools. It is another object that the disassembled device be compact for storage and transport. It is yet another object that the assembled device be provided with means to hold items that are used in conjunction with the cooler. The terms ice chest and cooler are used interchangeably to apply to insulated containers commonly employed to hold ice. These and other objects, features, and advantages of the invention will become more apparent when the detailed description is studied in conjunction with the drawings in which like elements are designated by like reference characters in the various drawing figures.

BRIEF DESCRIPTION OF THE DRAWINGS

FIG. 6 is a sectional view through line 6—6 of FIG. 1.
FIG. 7 is a perspective view of a bottle holder that mounts on a side member.
FIG. 8 is a perspective view of the assembled stand.

DETAILED DESCRIPTION OF PREFERRED EMBODIMENTS

Figure 1:
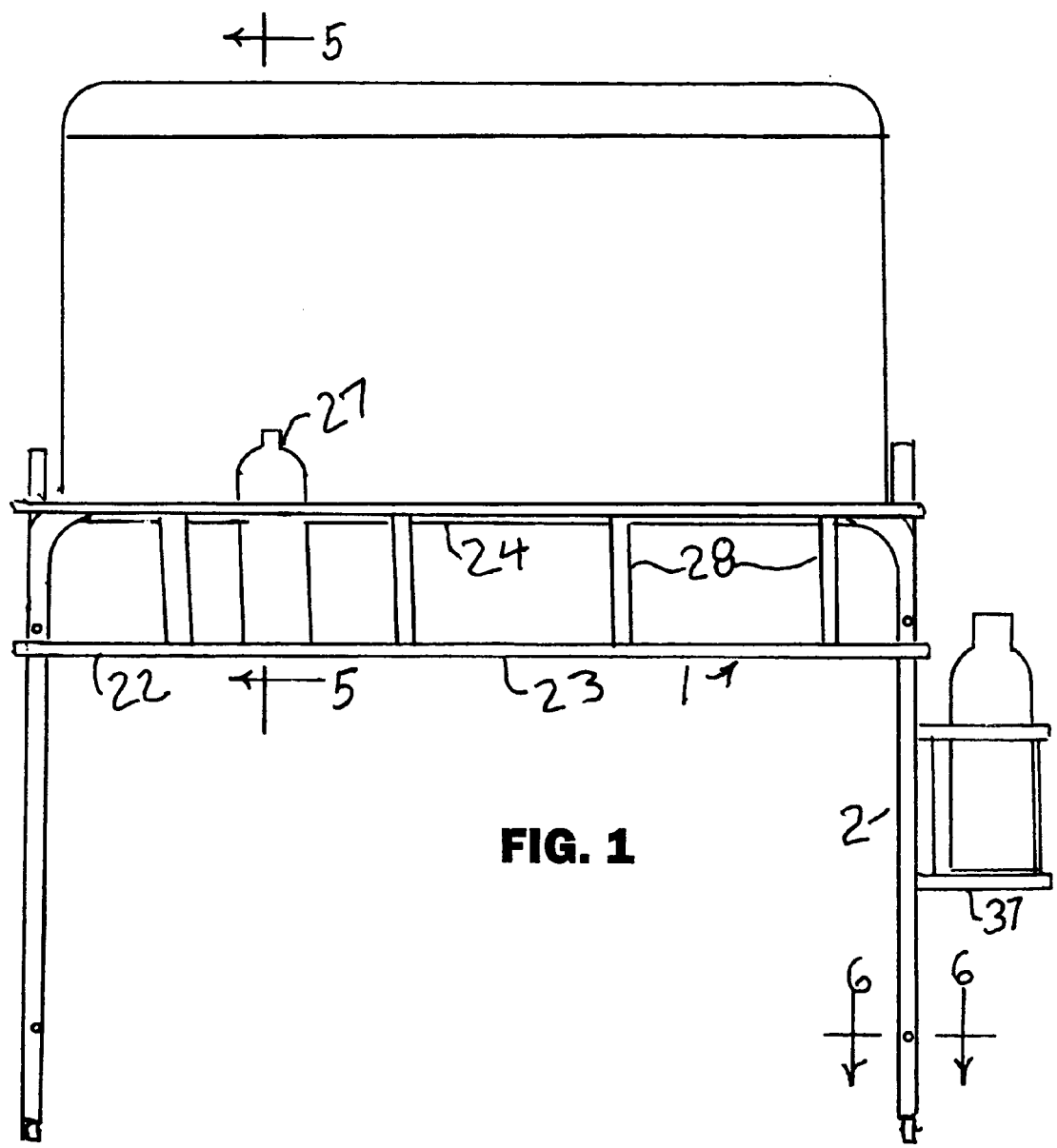
FIG. 1 is a front elevation view of the assembled stand in wheeled configuration.
Figure 2:
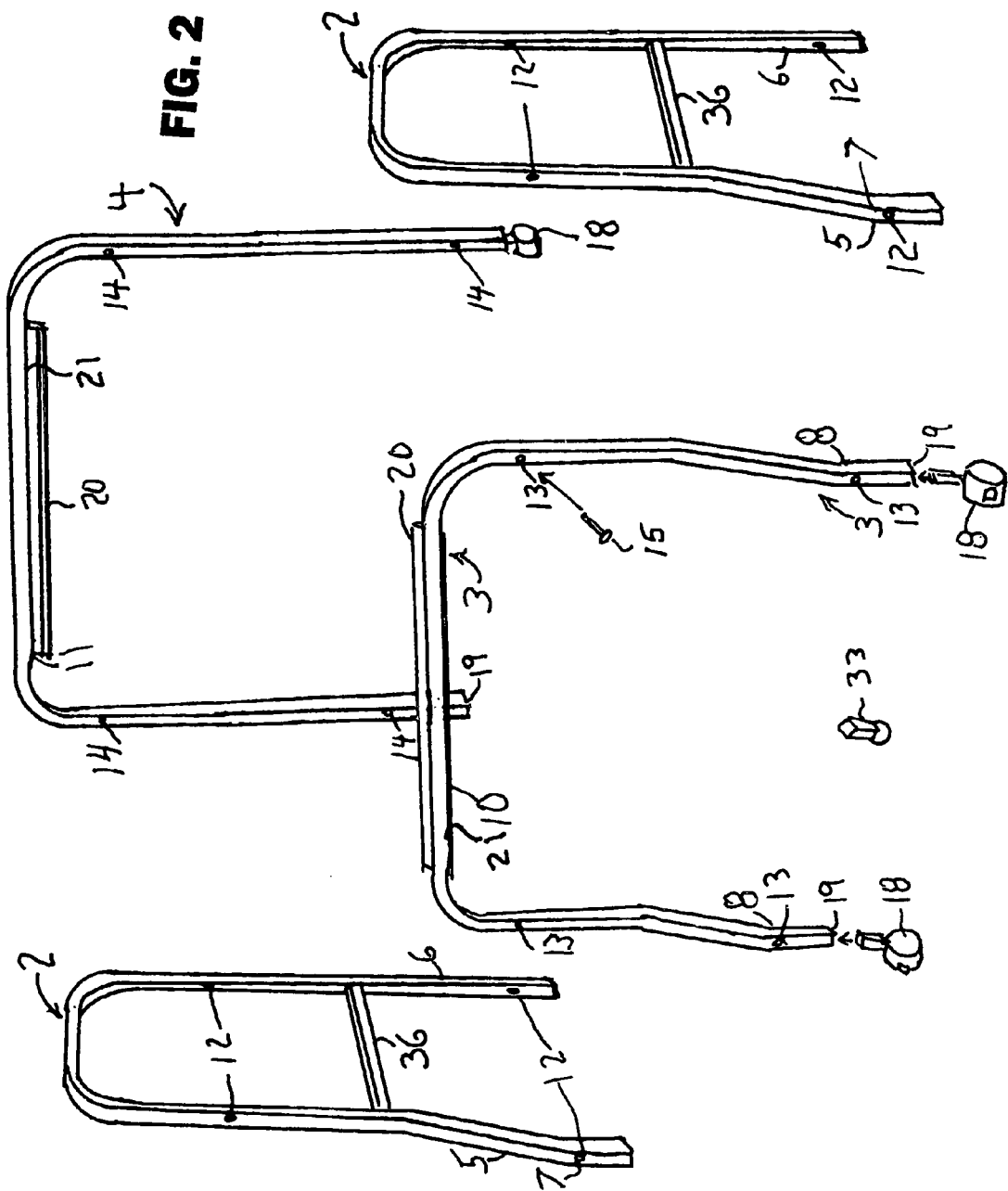
FIG. 2 is an exploded view of the disassembled stand.
Figure 3:
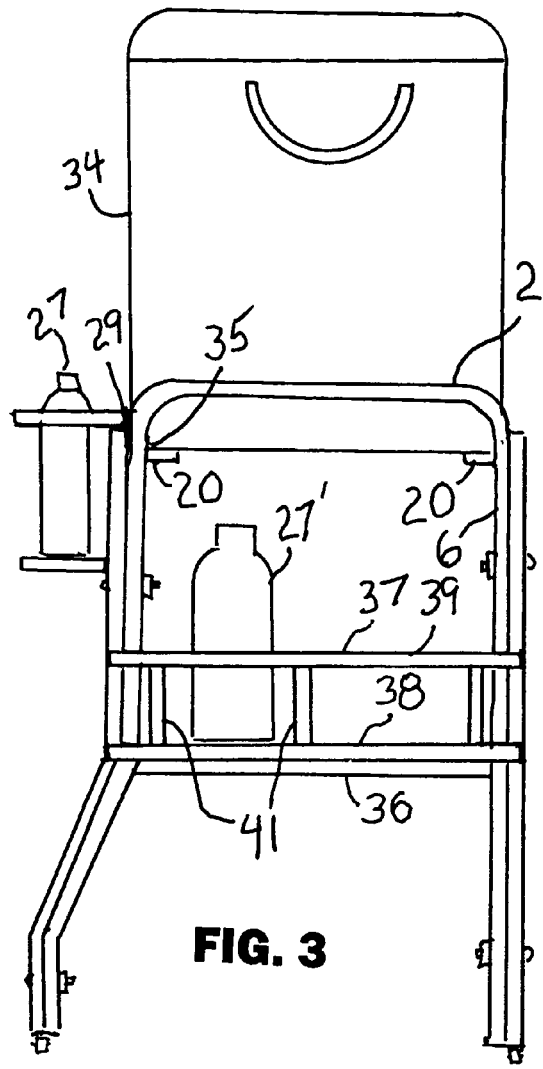
FIG. 3 is a side elevation view of the stand.
Figure 5:
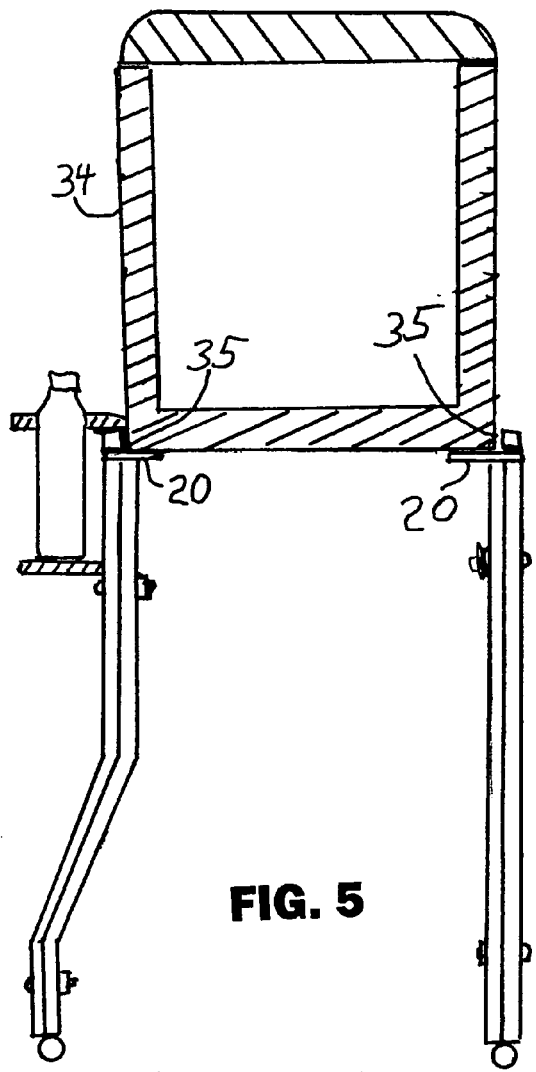
FIG. 5 is a sectional view through line 5—5 of FIG. 1.
Figure 4:
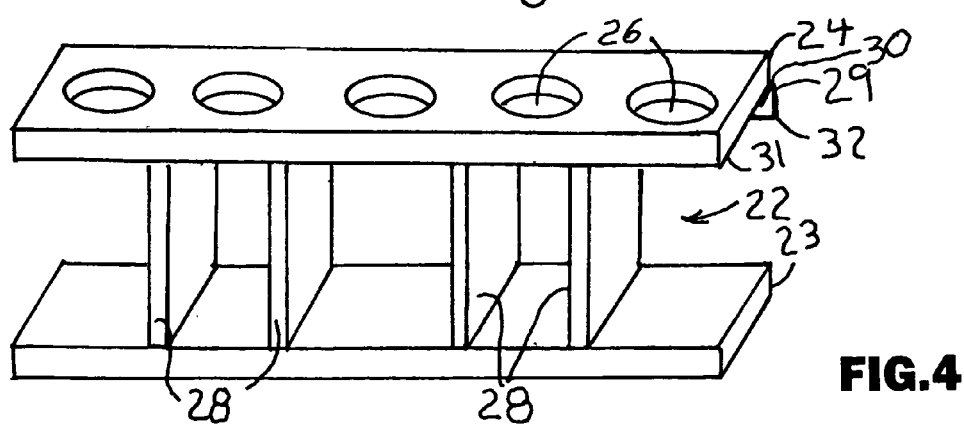
FIG. 4 is a perspective view of a bottle holder that mounts on a front member.

Referring now to the drawing Figures, the stand 1 of the invention has first and second side members 2, front member 3, and rear member 4. These members are formed of bent rectangular cross section tubing. Through holes 12, 13, 14 are disposed so that they align when assembled to receive fasteners 15 with wing nuts 16. These thereby draw flat faces 17 together to a tightly juxtaposed position for enhanced rigidity of the assembled structure. The forward bends 7 in the lower portion of forward legs 5 of the side members corresponds to the forward bends 8 in the lower portion of the legs of front member 3. Alternatively, it may be the rear member and rear legs of side members that may be bent outward. These extend the footprint of the stand to prevent it from tipping. Elongate first panels 20 are affixed to the undersides 21 of horizontal elements 10 and 11. They extend inward beyond elements 10 and 11 sufficiently to support the front and rear edges 35 of cooler 34. A transverse reinforcement strut 36 may optionally be provided on side members 2.

Wheel assemblies 18 may be inserted in the bottom end of certain of the legs 19 to make the stand into a rolling stand or cart. Alternatively mar-resistant cushioned elements 33 may be installed to protect a support surface when a non-rolling stand is desired.

A first bottle holder 22 may be provided. It comprises a rigid lower panel 23 and a rigid upper panel 24 held in spaced apart relation by vertical spacers 28. Apertures 26 in panel 24 are dimensioned to pass bottles 27 therethrough so that they will rest securely on the lower panel 23. An elongate rigid right angle element 29 has a first leg 30 affixed to the underside 31 of upper panel 24. A second leg 32 depends below panel 24, such that it will fit over the horizontal element 10 of the front member and rest upon the first panel 20. The panels 23,24 are long enough so that they rest securely against the legs of the front member when the second leg 32 of right angle element 29 is resting on the first panel 20.

A second bottle holder 37 may also be provided. It is supported on a side member 2 for holding additional bottles that may be of a different size than those held in the first bottle holder. A rigid upper panel 39 and lower panel 38 are affixed in spaced-apart relationship by vertical spacers 41, so that a bottle 27' will pass through apertures 40 in panel 39 and be held in place by lower panel 38. The panels 38,39 have a length 46 great enough to extend beyond the legs 5,6 of the side member. An elongate rigid element 42 is fixed to an inner edge 43 of the upper panel and extends downward therefrom so as to engage the inner aspect 44 of legs 5,6 while the outer aspect 45 of the legs is engaged by the upper panel and the lower panel when the lower panel rests upon the transverse member 36.

While we have shown and described the preferred embodiments of our invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:
1. A stand for supporting a cooler and items used with the cooler, the stand comprising:
 a) first and second side members, each side member having a forward leg and a rear leg joined at their tops by a horizontal element, one of the legs having a lower portion that is bent outward for enhanced stability;
 b) a rear member and a front member, each having two downward directed legs, the legs joined at their tops by a horizontal element, the legs of one of the rear member or the front member having a lower portion that is bent outward to correspond to the outward bend in the legs of the side members;
 c) opposed elongate rigid first panels fastened to the undersides of the horizontal elements of the front and rear members and extending inward sufficiently to support lower front and rear edges of a cooler thereon when the stand is assembled;

d) the side members and the front and rear members formed of rectangular section tubing;

e) a plurality of through holes in the legs of the side members and the front and rear members, the holes aligned so as to receive fasteners securing each side member leg to a leg of one of the front and rear members; and f) a plurality of fasteners for removable insertion in the through holes to reversibly join the side members to the front and rear members securely together with flat faces of the rectangular tubing juxtaposed to form a rigid frame.

2. The stand according to claim 1 further comprising wheel assemblies inserted in the bottom ends of four of the legs to form a rolling stand.

3. The stand according to claim 2 in which the fasteners are operable without tools.

4. The stand according to claim 1 in which the fasteners are operable without tools.

5. A stand for supporting a cooler and items used with the cooler, the stand comprising:

a) first and second side members, each side member having a forward leg and a rear leg joined at their tops by a horizontal element, each forward leg having a lower portion that is bent forward for enhanced stability;

b) a rear member and a front member, each having two downward directed legs, the legs joined at their tops by a horizontal element, the legs of the front member having a lower portion that is bent forward to correspond to the forward bend in the forward legs of the side members;

c) opposed elongate rigid first panels fastened to the undersides of the horizontal elements of the front and rear members and extending inward sufficiently to support lower front and rear edges of a cooler thereon when the stand is assembled;

d) the side members and the front and rear members formed of rectangular section tubing;

e) a plurality of through holes in the legs of the side members and the front and rear members, the holes aligned so as to receive fasteners securing each side member leg to a leg of one of the front and rear members; and f) a plurality of fasteners for removable insertion in the through holes to reversibly join the side members to the front and rear members securely together with flat faces of the rectangular tubing juxtaposed to form a rigid frame.

6. The stand according to claim 5 further comprising wheel assemblies inserted in the bottom ends of four of the legs to form a rolling stand.

7. The stand according to claim 6 in which the fasteners are operable without tools.

8. The stand according to claim 5 in which the fasteners are operable without tools.

9. The stand according to claim 5 further comprising a first bottle holder having:

a) a rigid lower panel substantially the length of the horizontal element of the front member;

b) a rigid upper panel substantially the length of the horizontal element of the front member, the upper panel provided with apertures dimensioned to receive bottles therethrough;

c) vertical spacers affixed to both the upper and lower panels to secure the two panels in spaced-apart relationship so that a bottle passed through an upper panel aperture will rest securely on the lower panel; and d) an elongate rigid right-angle element affixed by a first leg to the underside of the upper panel with a second leg depending below the upper panel such that the second leg will fit over the horizontal element of the front member and rest upon the first panel to thereby be held securely to the front of the stand.

10. The stand according to claim 5 further comprising a second bottle holder having:

a) a rigid lower panel having a length great enough to extend between the two legs of a side member;

b) a rigid upper panel having a length great enough to extend between the two legs of a side member;

c) the upper panel provided with apertures dimensioned to receive bottles therethrough;

d) vertical spacers affixed to both the upper and lower panels to secure the two panels in spaced-apart relationship so that a bottle passed through an upper panel aperture will rest securely on the lower panel; and e) an elongate rigid element affixed to the edge of the upper panel and depending downward therefrom at right angles thereto so as to engage the two legs of the side member at inner aspects thereof while the outer aspects of the legs engage the upper and lower panels to thereby hold the second bottle holder securely to the side of the stand.

11. A stand for supporting a cooler and items used with the cooler, the stand comprising:

a) first and second side members, each side member having a forward leg and a rear leg joined at their tops by a horizontal element, each rear leg having a lower portion that is bent outward for enhanced stability;

b) a rear member and a front member, each having two downward directed legs, the legs joined at their tops by a horizontal element, the legs of the rear member having a lower portion that is bent outward to correspond to the outward bend in the rear legs of the side members;

c) opposed elongate rigid first panels fastened to the undersides of the horizontal elements of the front and rear members and extending inward sufficiently to support lower front and rear edges of a cooler thereon when the stand is assembled;

d) the side members and the front and rear members formed of rectangular section tubing;

e) a plurality of through holes in the legs of the side members and the front and rear members, the holes aligned so as to receive fasteners securing each side member leg to a leg of one of the front and rear members; and f) a plurality of fasteners for removable insertion in the through holes to reversibly join the side members to the front and rear members securely together with flat faces of the rectangular tubing juxtaposed to form a rigid frame.

12. The stand according to claim 11 further comprising wheel assemblies inserted in the bottom ends of four of the legs to form a rolling stand.

13. The stand according to claim 12 in which the fasteners are operable without tools.

14. The stand according to claim 11 in which the fasteners are operable without tools.

15. The stand according to claim 11 further comprising a first bottle holder having:

a) a rigid lower panel substantially the length of the horizontal element of the front member;

b) a rigid upper panel substantially the length of the horizontal element of the front member, the upper panel provided with apertures dimensioned to receive bottles therethrough;

c) vertical spacers affixed to both the upper and lower panels to secure the two panels in spaced-apart relationship so that a bottle passed through an upper panel aperture will rest securely on the lower panel; and d) an elongate rigid right-angle element affixed by a first leg to the underside of the upper panel with a second leg depending below the upper panel such that the second leg will fit over the horizontal element of the front member and rest upon the first panel to thereby be held securely to the front of the stand.

16. The stand according to claim 11 further comprising a second bottle holder having:

a) a rigid lower panel having a length great enough to extend between the two legs of a side member;

b) a rigid upper panel having a length great enough to extend between the two legs of a side member;

c) the upper panel provided with apertures dimensioned to receive bottles therethrough;

d) vertical spacers affixed to both the upper and lower panels to secure the two panels in spaced-apart relationship so that a bottle passed through an upper panel aperture will rest securely on the lower panel; and e) an elongate rigid element affixed to the edge of the upper panel and depending downward therefrom at right angles thereto so as to engage the two legs of the side member at inner aspects thereof while the outer aspects of the legs engage the upper and lower panels to thereby hold the second bottle holder securely to the side of the stand.

* * * * *